US006171505B1

(12) United States Patent
Maury et al.

(10) Patent No.: US 6,171,505 B1
(45) Date of Patent: *Jan. 9, 2001

(54) HIGHER ACTIVES DISPERSION POLYMER TO AID CLARIFICATION, DEWATERING, AND RETENTION AND DRAINAGE

(75) Inventors: Elise E. Maury, Leiden (NL); Rudolf Buelte, Gruendau (DE); Cathy C. Johnson, Geneva, IL (US)

(73) Assignee: Nalco Chemical Company, Naperville, IL (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/054,980

(22) Filed: Apr. 3, 1998

(51) Int. Cl.$^7$ ........................................................ C02F 1/56
(52) U.S. Cl. .................. 210/727; 162/164.6; 162/168.3; 162/189; 210/734; 210/928
(58) Field of Search .................... 162/164.6, 168.3, 162/189, 190; 210/725, 727, 708, 728, 734, 928

(56) References Cited

U.S. PATENT DOCUMENTS

| 3,409,546 | 11/1968 | Mogelnicki et al. | 210/734 |
|---|---|---|---|
| 3,414,514 | 12/1968 | Buhl | 210/734 |
| 3,897,333 | 7/1975 | Field et al. | 210/734 |
| 3,928,448 | 12/1975 | Ballweber et al. | 260/567.6 P |
| 4,191,645 | 3/1980 | Begala et al. | 210/734 |
| 4,929,655 | 5/1990 | Takeda et al. | 524/458 |
| 5,006,590 | 4/1991 | Takeda et al. | 524/458 |
| 5,126,014 | 6/1992 | Chung | 162/164.6 |
| 5,234,604 | 8/1993 | Liao et al. | 210/734 |
| 5,266,164 | 11/1993 | Novak et al. | 162/168.2 |
| 5,429,749 | * 7/1995 | Chung et al. | 210/734 |
| 5,587,415 | 12/1996 | Takeda | 524/458 |
| 5,597,859 | 1/1997 | Hurlock et al. | 524/458 |
| 5,696,194 | * 12/1997 | Conners | 526/287 |
| 5,708,071 | 1/1998 | Takeda | 524/458 |
| 5,725,780 | * 3/1998 | Carpenter et al. | 210/728 |

FOREIGN PATENT DOCUMENTS 7-71678   8/1995  (JP).

* cited by examiner

*Primary Examiner*—Peter A. Hruskoci
(74) *Attorney, Agent, or Firm*—Michael B. Martin; Thomas M. Breininger

(57) ABSTRACT

The invention is a method for clarifying, dewatering or improving retention and drainage of industrial waste water or paper furnish with an effective amount of at least one dispersion of a water soluble cationic polymer flocculant wherein the improvement comprises the addition of said polymer which has a concentration of at least twenty five percent to said waste water or paper furnish. The industrial waste is preferably food processing waste water, oily waste water, paper mill waste water and inorganic contaminated waste water. The paper furnish may be an aqueous cellulosic suspension.

11 Claims, No Drawings

HIGHER ACTIVES DISPERSION POLYMER TO AID CLARIFICATION, DEWATERING, AND RETENTION AND DRAINAGE

FIELD OF INVENTION

The invention is a method for clarifying industrial waste water or paper furnish with an effective amount of at least one dispersion of a water soluble cationic polymer flocculant wherein the improvement comprises the addition of said polymer which has a concentration of at least twenty five percent to said waste water or paper furnish. The industrial waste is preferably food processing waste water, oily waste water, paper mill waste water and inorganic contaminated waste water. The paper furnish may be an aqueous cellulosic suspension.

BACKGROUND OF THE INVENTION

This invention relates to polymers that are of particular value as flocculants for suspensions of organic matter of a proteinaceous or cellulosic nature such as are to be found in sewage and industrial plant treatment effluents or in paper mills.

It is commonly accepted that such suspended materials which are hydrophilic in nature and which often have specific gravities quite close to that of the aqueous liquors in which they are suspended, contrast in a marked way with the more hydrophobic mineral suspensions in that they are frequently found to be much more difficult to flocculate economically with chemical reagents prior to a physical dewatering step such as filtration, flotation, sedimentation, dewatering or in the retention of such materials for processing. These difficulties are particularly noticeable when higher proportions of suspended matter are present, commonly involving concentrations of 0.5 percent by weight and upwards wherein the suspensions take on a paste-like consistency and are commonly described as sludges or paper furnishes.

It is well known that the clarification or dewatering of sewage and industrial sludges and similar organic suspensions may be aided with the use of chemical reagents, added in order to induce a state of coagulation or flocculation which facilitates the process of solid/liquid or liquid/liquid separation from water. For this purpose, lime or salts of iron or aluminum have been utilized. More recently synthetic polyelectrolytes, particularly certain cationic copolymers of acrylamide, have been found to be of interest.

Cationically charged water soluble or water dispersible polymers are utilized in a variety of processes that involve the separation of solids or immiscible liquids dispersed or suspended in water from water, and the dewatering of solids containing water. These types of polymers, which may be natural or synthetic, are broadly termed coagulants and flocculants. These polymers can be utilized in such diverse processes as emulsion breaking, sludge dewatering, raw water clarification, drainage and retention aids in the manufacture of pulp and paper, flotation aids in mining processing and color removal.

Polymers of this type generally work by neutralizing the anionic charge of the suspended solids, or liquids, which are to be removed. These solids or liquids may be waste which must be removed from water, or desirable products which are recovered from aqueous systems, such as coal fines, which can be coagulated or flocculated and sold as fuel.

In the water treatment field of solids/liquid separation, suspended solids are removed from water by a variety of processes, including sedimentation, straining, flotation, filtration, coagulation, flocculation, and emulsion breaking among others. Additionally, after suspended solids are removed from the water they must often be dewatered so that they may be further treated or properly disposed of. Liquids treated for solids removal often have as little as several parts per billion of suspended solids or dispersed oils, or may contain large amounts of suspended solids or oils. Solids being dewatered may contain anywhere from 0.25 weight percent solids, to 40 or 50 weight percent solids material. Solids/liquid or liquid/liquid separation processes are designed to remove solids from liquids, or liquids from liquids.

While strictly mechanical means have been used to effect solids/liquid separation, modern methods often rely on mechanical separation techniques which are augmented by synthetic and natural cationic polymeric materials to accelerate the rate at which solids can be removed from water. These processes include the treatment of raw water with cationic coagulant polymers which settle suspended inorganic particulates and make the water usable for industrial or municipal purposes. Other examples of these processes include the removal of colored soluble species from paper mill effluent wastes, the use of organic flocculent polymers to flocculate industrial and municipal waste materials, sludge recovery and emulsion breaking.

Regarding the mechanism of separation processes, particles in nature have either a cationic or anionic charge. Accordingly, these particles often are removed by a water soluble coagulant or flocculent polymer having a charge opposite to that of the particles. This is referred to as a polyelectrolyte enhanced solids/liquid separation process, wherein a water soluble or dispersionable ionically charged polymer is added to neutralize the charged particles or emulsion droplets to be separated. The dosage of these polymers is critical to the performance of the process. Too little ionically charged polymer, and the suspended particles will not be charge neutralized and will thus still repel each other. Too much polymer, and the polymer will be wasted, or worse, present a problem in and of itself.

Examples of such cationic polymers for dewatering include U.S. Pat. No. 3,409,546 which describes the use of N-(amino methyl)-polyacrylamides in conjunction with other cationic polymers for the treatment of sewage sludges; U.S. Pat. No. 3,414,514 which describes the use of a copolymer of acrylamide and a quaternized cationic methacrylate ester, JP 61-106072 which describes water-soluble copolymers and another class of cationic polymers used to dewater sludges described in U.S. Pat. No. 3,897,333. Utilization of polyethyleneimines and homopolymers of cationic acrylates and methacrylates and other cationic polymers such as polyvinyl pyridines is also known.

Another example of a cationic polymer useful for sludge treatment is U.S. Pat. No. 4,191,645, in which cationic copolymers prepared from a nonionic monomer, such as acrylamide, and a cationic monomer, such as trimethylammonium ethylmethacrylate methyl sulfate quaternary (TMAEM.MSQ) or dimethylaminoethylacrylate methyl sulfate quaternary (DMAEA.MSQ) are disclosed. Further examples of polymeric treatments for sludge dewatering include the 1,4-dichloro-2-butene dimethylamine ionene chloride polymer as disclosed in U.S. Pat. No. 3,928,448 and the block copolymers disclosed in U.S. Pat. No. 5,234,604.

Among treatments useful for improving retention and drainage are those described in U.S. Pat. Nos. 5,126,014 and 5,266,164.

Notwithstanding the variety of commercially available polymers which have been found to be capable of flocculating or coagulating solids sludges, there are various circumstances which tend to limit the usefulness of these reagents. While for certain sludges economical treatments with these known reagents are feasible, more often sludges require very high and cost-ineffective dosages of reagents for successful treatment. Moreover, variations often occur in sludge from any one source. For example, variations in the supply of material to the waste water/sludge/paper furnish process water and/or in the oxidizing conditions that may be involved in the production of these waters lead to a variety of particle types which must be removed. Furthermore, it is not uncommon to encounter sludges which are, for some reason, not amenable to flocculation by any of the known polymeric flocculating agents. It is therefore an object of the invention to provide to the art a superior method for the dewatering of sludge-containing industrial waste waters or in the retention of industrial processing aids.

SUMMARY OF THE INVENTION

The invention is a method for clarifying industrial waste water or paper furnish with an effective amount of at least one dispersion of a water soluble cationic polymer flocculant wherein the improvement comprises the addition of said polymer which has a concentration of at least twenty five weight percent to said waste water or paper furnish. The industrial waste is preferably food processing waste water, oily waste water, paper mill waste water and inorganic contaminated waste water. The paper furnish may be an aqueous cellulosic suspension.

DESCRIPTION OF THE INVENTION

Methods for manufacturing the polymer dispersion used in the invention are described in detail in U.S. Pat. Nos. 5,006,590 and 4,929,655, assigned to Kyoritsu Yuki Co., Ltd., Tokyo, Japan, and U.S. Pat. Nos. 5,708,071 and 5,587,415 assigned to Hymo Corporation of Tokyo, Japan. The disclosures of these two patents are incorporated herein by reference.

This invention represents a substantial improvement in the art of treatment of aqueous systems with dispersion polymers. As will be shown in the Examples, the lower concentration dispersion polymers presently utilized and disclosed are inferior to those dispersion polymers at higher concentrations disclosed herein. The superiority of the polymers disclosed herein is much more than an incremental additive effect which would be normally expected by those skilled in the art. The Examples will illustrate this unexpectedly greater activity at much lower dosage, which was previously unforeseeable.

The Monomers

According to the invention, the polymer dispersion used to treat the produced water is prepared from a water-soluble monomer mixture containing at least 5 mole % of a cationic monomer represented by the general formula (I):

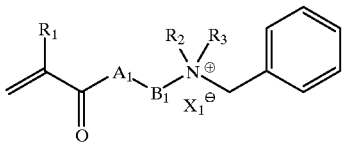

wherein $R_1$ is H or $CH_3$; $R_2$ and $R_3$ are each an alkyl group having 1 to 2 carbon atoms; $A_1$ is an oxygen atom or NH; $B_1$ is an alkyl group having 2 to 4 carbon atoms or a hydroxypropyl group and $X_1$ is a counter anion. The above water-soluble monomer mixture is soluble in the aqueous solution of the anionic salt. The polymer generated from the monomer mixture is, however, insoluble in the aqueous anionic salt solution. The polymer of the monomer mixture can also be used as the seed polymer. The seed polymer is described in detail below.

The above cationic monomer represented by the general formula (I) preferably is a quaternary ammonium salt obtained by the reaction of benzyl chloride and dimethylaminoethyl acrylate, diethylaminoethyl acrylate, dimethylaminohydroxypropyl acrylate, dimethylaminopropyl acrylamide, dimethylaminoethyl methacrylate, dimethylaminoethyl methacrylate, diethylaminoethyl methacrylate and dimethylaminopropyl methacrylamide.

Monomers preferably copolymerized with the cationic monomer represented by the general formula (I) includes acrylamide, methacrylamide or other N-substituted (meth) acrylamides and the cationic monomers represented by the general formula (II):

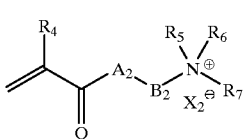

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkyl group having 2 to 4 carbon atoms or a hydroxypropyl group and $X_2$ is a counter anion. $X_1$ and $X_2$ may be anionic counterions such as halides, pseudohalides, $-SO_3OCH_3$, and $-OC(O)CH_3$ among others.

Preferable monomers represented by the formula (II) include the ammonium salts of dimethylaminoethyl acrylate, diethylaminoethyl acrylate, dimethylaminopropyl acrylamide, diethylaminopropyl acrylamide and dimethylhydroxypropyl acrylate, dimethylaminoethyl methacrylate, diethylaminoethyl methacrylate, dimethylaminopropyl methacrylamide, diethylaminopropyl methacrylamide and dimethylhydroxypropyl methacrylate or other N-substituted (meth)acrylamides as well as the methylated and ethylated quaternary salts. Among the more preferable cationic monomers represented by the general formula (II) are the salts and methylated quaternary salts of dialkylaminoethyl acrylate and dialkylaminoethyl methacrylate. The concentration of the above-mentioned monomers in the polymerization reaction mixture is suitably in the range of 5 to 30% by weight.

The Anionic Salts

The anionic salt to be incorporated in the aqueous solution according to the present invention is suitably a sulfate, a phosphate, a chloride or a mixture thereof. Preferable salts include ammonium sulfate, sodium sulfate, magnesium sulfate, aluminum sulfate, ammonium chloride, sodium chloride, ammonium hydrogen phosphate, sodium hydrogen phosphate and potassium hydrogen phosphate. In the present invention, these salts may be each used as an aqueous solution thereof having a combined concentration of 10% or above.

The Dispersants

A dispersant polymer (also referred to as stabilizer polymer) is present in the aqueous anionic salt solution in which the polymerization of the above monomers occurs. The dispersant polymer is a water-soluble high molecular weight cationic polymer. The dispersant polymer is at least partially soluble in the above-mentioned aqueous salt solution. The dispersant polymer is preferably used in an amount of from 1 to 10% by weight based on the total weight of the monomers. The dispersant polymer is composed of 5 mole % or more of a diallyldialkyl ammonium halide or of a cationic monomer unit represented by the formula I or II. Preferably, the residual mole % is acrylamide or methacrylamide or other N-substituted (meth)acrylamides or diallyldimethyl ammonium chloride. The performance of the dispersant is not greatly affected by molecular weight. However, the molecular weight of the dispersant is preferably in the range of 10,000 to 10,000,000. According to one embodiment of the invention, a multifunctional alcohol such as glycerin or polyethylene glycol or a chain transfer agent such as sodium formate is coexistent in the polymerization system. The deposition of the fine particles is smoothly carried out in the presence of these agents.

The Dispersion Polymers

For the polymerizations, a usual water-soluble radical-forming agent can be employed, but preferably water-soluble azo compounds such as 2,2'-azobis(2-amidinopropane) hydrochloride and 2,2'-azobis(N,N'-dimethyleneisobutylamine) hydrochloride are used.

According to one embodiment of the invention, a seed polymer may be added before the beginning of the polymerization of the above monomers for the purpose of obtaining a fine dispersion. The seed polymer is a water-soluble cationic polymer insoluble in the aqueous solution of the anionic salt. The seed polymer is preferably a polymer prepared from the above monomer mixture by the process described herein. Nevertheless, the monomer composition of the seed polymer need not always be equal to that of the water-soluble cationic polymer formed during polymerization. However, like the water-soluble polymer formed during polymerization, the seed polymer should contain at least 5 mole percent of cationic monomer units represented by the general formula (I). According to one embodiment of the invention, the seed polymer used in one polymerization reaction is the water-soluble polymer prepared in a previous reaction which used the same monomer mixture.

One aspect of this invention is a method for clarifying waste water with an effective clarifying amount of at least one dispersion of a water soluble cationic polymer flocculant; wherein said water soluble flocculant is added to said waste water in an effective amount to flocculate suspended solids, the suspended solids are removed, and a clarified water is obtained, said dispersion of said water soluble cationic polymer flocculent formed from polymerizing vinylic monomers under free-radical forming conditions in a medium containing water, monomers, stabilizer polymer, and an aqueous anionic salt solution; wherein said water-soluble cationic polymer flocculant is polymerized from a) at least 5 mole % of a cationic monomer selected from the group consisting of:
monomers of general formula (I)

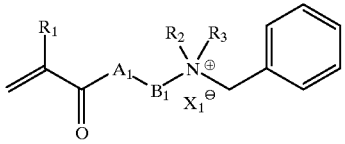

wherein $R_1$ is selected from the group consisting of H and $CH_3$, $R_2$ and $R_3$ are selected from the group consisting of $C_1$ alkyl and $C_2$ alkyl, $A_1$ is selected from the group consisting of O and NH, $B_1$ is selected from the group consisting of $C_2$ alkyl, $C_3$ alkyl and hydropropoxy groups, and $X_1^-$ is an anionic counterion and monomers of general formula II:

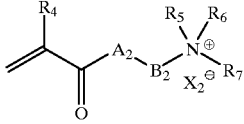

wherein $R_4$ is selected from the group consisting of H and $CH_3$, $R_5$ and $R_6$ are selected from the group consisting of $C_1$ alkyl and $C_2$ alkyl; $R_7$ is selected from the group consisting of hydrogen atom, $C_1$ alkyl and $C_2$ alkyl; $A_2$ is selected from the group consisting of an oxygen atom and NH; $B_2$ is selected from the group consisting of $C_2$ alkyl, $C_3$ alkyl, $C_4$ alkyl and hydroxypropyl and $X_2^-$ is an anionic counterion with b) at least 5 mole % of a monomer selected from the group consisting of $C_1$–$C_{10}$ N-alkyl acrylamide, $C_1$–$C_{10}$ N,N-dialkyl arylamide, $C_1$–$C_{10}$ N-alkylmethacrylamide, $C_1$–$C_{10}$ N,N-dialkylmethacrylamide, N-aryl acrylamide, N,N-diaryl acrylamide, N-aryl methacrylamide, N,N-diaryl methacrylamide, N-arylalkyl acrylamide, N,N-diarylalkyl acrylamide, N-arylalkyl methacrylamide, N,N-diarylalkyl methacrylamide, acrylamide and methacrylamide;

and wherein said stabilizer polymer is a cationic polymer which is at least partially soluble in said aqueous solution of said anionic salt, wherein the improvement comprises the addition of said water-soluble cationic flocculant polymer dispersion to said waste water at a concentration of at least twenty-five weight percent polymer dispersion in water.

Another aspect of this invention is a method for dewatering waste water with an effective dewatering amount of at least one dispersion of a water soluble cationic polymer flocculant; wherein said water soluble flocculant is added to said waste water in an effective amount to dewater suspended solids, the suspended solids are removed, and a clarified water is obtained, said dispersion of said water soluble cationic polymer flocculant formed from polymerizing vinylic monomers under free-radical forming conditions in a medium containing water, monomers, stabilizer polymer, and an aqueous anionic salt solution; wherein said water-soluble cationic polymer flocculant is polymerized from a) at least 5 mole % of a cationic monomer selected from the group consisting of monomers: of general formula I

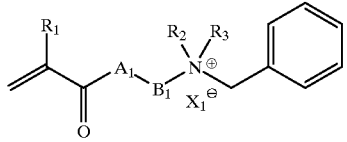

wherein $R_1$ is selected from the group consisting of H and $CH_3$, $R_2$ and $R_3$ are selected from the group consisting of $C_1$ alkyl and $C_2$ alkyl, $A_1$ is selected from the group consisting of O and NH, $B_1$ is selected from the group consisting of $C_2$ alkyl, $C_3$ alkyl and hydropropoxy groups, and $X_1^-$ is an anionic counterion and monomers of general formula II:

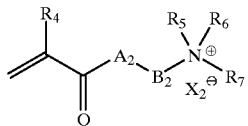

wherein $R_4$ is selected from the group consisting of H and $CH_3$, $R_5$ and $R_6$ are selected from the group consisting of $C_1$ alkyl and $C_2$ alkyl; $R_7$ is selected from the group consisting of hydrogen atom, $C_1$ alkyl and $C_2$ alkyl; $A_2$ is selected from the group consisting of an oxygen atom and NH; $B_2$ is selected from the group consisting of $C_2$ alkyl, $C_3$ alkyl, $C_4$ alkyl and hydroxypropyl and $X_2^-$ is an anionic counterion with b) at least 5 mole % of a monomer selected from the group consisting of $C_1$–$C_{10}$ N-alkyl acrylamide, $C_1$–$C_{10}$ N,N-dialkyl arylamide, $C_1$–$C_{10}$ N-alkylmethacrylamide, $C_1$–$C_{10}$ N,N-dialkylmethacrylamide, N-aryl acrylamide, N,N-diaryl acrylamide, N-aryl methacrylamide, N,N-diaryl methacrylamide, N-arylalkyl acrylamide, N,N-diarylalkyl acrylamide, N-arylalkyl methacrylamide, N,N-diarylalkyl methacrylamide, acrylamide and methacrylamide;

and wherein said stabilizer polymer is a cationic polymer which is at least partially soluble in said aqueous solution of said anionic salt; wherein the improvement comprises the addition of said water-soluble cationic flocculent polymer dispersion to said waste water at a concentration of at least twenty-five weight percent polymer dispersion in water.

Yet another aspect of this invention is a method for improving retention and drainage of process water in pulp and paper production with an effective amount of at least one dispersion of a water soluble cationic polymer flocculant; wherein said water soluble flocculant is added to said process water in an effective amount to improve retention and drainage, said dispersion of said water soluble cationic polymer flocculant formed from polymerizing vinylic monomers under free-radical forming conditions in a medium containing water, monomers, stabilizer polymer, and an aqueous anionic salt solution; wherein said water-soluble cationic polymer flocculant is polymerized from a) at least 5 mole % of a cationic monomer selected from the group consisting of:
monomers of general formula I

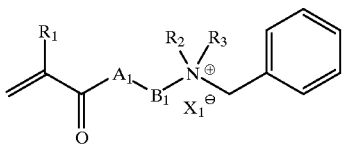

wherein $R_1$ is selected from the group consisting of H and $CH_3$, $R_2$ and $R_3$ are selected from the group consisting of $C_1$ alkyl and $C_2$ alkyl, $A_1$ is selected from the group consisting of O and NH, $B_1$ is selected from the group consisting of $C_2$ alkyl, $C_3$ alkyl and hydropropoxy groups, and $X_1^-$ is an anionic counterion and monomers of general formula II:

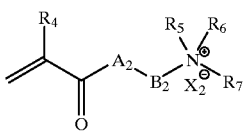

wherein $R_4$ is selected from the group consisting of H and $CH_3$, $R_5$ and $R_6$ are selected from the group consisting of $C_1$ alkyl and $C_2$ alkyl; $R_7$ is selected from the group consisting of hydrogen atom, $C_1$ alkyl and $C_2$ alkyl; $A_2$ is selected from the group consisting of an oxygen atom and NH; $B_2$ is selected from the group consisting of $C_2$ alkyl, $C_3$ alkyl, $C_4$ alkyl and hydroxypropyl and $X_2^-$ is an anionic counterion with b) at least 5 mole % of a monomer selected from the group consisting of $C_1$–$C_{10}$ N-alkyl acrylamide, $C_1$–$C_{10}$ N,N-dialkyl arylamide, $C_1$–$C_{10}$ N-alkylmethacrylamide, $C_1$–$C_{10}$ N,N-dialkylmethacrylamide, N-aryl acrylamide, N,N-diaryl acrylamide, N-aryl methacrylamide, N,N-diaryl methacrylamide, N-arylalkyl acrylamide, N,N-diarylalkyl acrylamide, N-arylalkyl methacrylamide, N,N-diarylalkyl methacrylamide, acrylamide and methacrylamide;

and wherein said stabilizer polymer is a cationic polymer which is at least partially soluble in said aqueous solution of said anionic salt; wherein the improvement comprises the addition of said water-soluble cationic flocculant polymer dispersion to said waste water at a concentration of at least twenty-five weight percent polymer dispersion in water.

Preferred polymeric flocculants are poly(DMAEA.MCQ/AcAm), poly(DMAEA.BCQ/AcAm) and poly(DMAEA.MCQ/DMAEA.BCQ/AcAm). For any aspect of this invention, a stabilizer polymer may be polymerized from at least 5 mole % of cationic monomers selected from the group consisting of monomers of general formula I

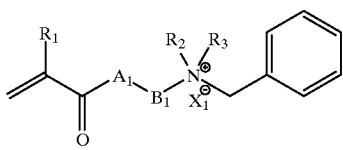

wherein $R_1$ is selected from the group consisting of H and $CH_3$, $R_2$ and $R_3$ are selected from the group consisting of $C_1$ alkyl and $C_2$ alkyl, $A_1$ is selected from the group consisting of O and NH, $B_1$ is selected from the group consisting of $C_2$ alkyl, $C_3$ alkyl and hydropropoxy groups, and $X_1^-$ is an anionic counterion; diallyl dialkyl ammonium halides and monomers of general formula II:

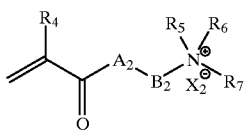

wherein $R_4$ is selected from the group consisting of H and $CH_3$, $R_5$ and $R_6$ are selected from the group consisting of $C_1$ alkyl and $C_2$ alkyl; $R_7$ is selected from the group consisting of hydrogen atom, $C_1$ alkyl and $C_2$ alkyl; $A_2$ is selected from the group consisting of an oxygen atom and NH; $B_2$ is selected from the group consisting of $C_2$ alkyl, $C_3$ alkyl, $C_4$ alkyl and hydroxypropyl and $X_2^-$ is an anionic counterion. A preferred diallyl dialkyl ammonium halide is diallyl dimethyl ammonium chloride (DADMAC).

The waste water may be selected from the group consisting of industrial wastewater and municipal wastewater. Moreover, the industrial wastewater may be selected from the group consisting of food processing waste water, oily waste water, paper mill waste water and inorganic-contaminated waste water. The polymers described herein may be used in conjunction with coagulants such as poly (DADMAC), poly(epichlorohydrin/dimethylamine) and inorganic materials among others.

The polymers of this invention were compared to polymers which were manufactured by the Derypol S.A. Corporation of Spain. The polymer preparations are available from Derypol S.A. Corporation under the trade name designations DR-2570 (sold at 15% concentration), DR-3000 and DR-4000 (both of which are sold at 20% concentrations).

The following examples are presented to describe preferred embodiments and utilities of the invention and are not meant to limit the invention unless otherwise stated in the claims appended hereto.

EXAMPLE 1

A 25% polymer solids, 65/25/10 mole percent AcAm/DMAEA. BCQ/DMAEA. MCQ dispersion was synthesized in the following manner. A 1500 cc reaction flask was fitted with a mechanical stirrer, thermocouple, condenser, nitrogen purge tube, addition port, and heating tape. To this reactor was added 173.7 g of acrylamide (50% aqueous solution, available from Nalco Chemical Co. of Naperville, Ill.), 158.5 g of dimethylaminoethyl acrylate benzyl chloride quaternary salt (80% aqueous solution, available from Nalco Chemical Co. of Naperville, Ill.), 45.5 g of dimethylaminoethyl acrylate methyl chloride quaternary salt (80% aqueous, available from CPS Chemical Company of Old Bridge, N.Y.), 18.8 g of glycerin, 45.9 g of the homopolymer of dimethylaminoethyl acrylate methyl chloride quaternary (20% aqueous solution, available from Nalco Chemical Co. of Naperville, Ill.), 16.7 g of a copolymer of diallyldimethylammonium chloride and dimethylaminoethyl acrylate benzyl chloride quaternary (15% aqueous solution, available from Nalco Chemical Co. of Naperville, Ill.), 1.5 g of a 1.0% aqueous solution of sodium bisulfite, 0.5 g of sodium diethylene triamine pentaacetate (DABERSEEN 503 available from Derypol S.A. of Spain, 45% aqueous solution), 135.0 g of ammonium sulfate, and 332.3 g of deionized water. The mixture was then heated to 35° C. under a constant nitrogen purge while stirring at 90 rpm. After reaching 35° C. and under a constant purge of nitrogen, 3.7 g of a 1.0% aqueous solution of 2,2'-azobis(N,N'-dimethyleneisobutyramidine) dihydrochloride (WAKO VA-044 available from Wako Chemicals of Dallas, Tex.) was added to the reaction mixture and the temperature was maintained for approximately 16 hours. The temperature was then increased to 50° C. and 1.5 g of a 10% aqueous solution of ammonium persulfate and 1.5 g of a 10% aqueous solution of sodium bisulfite were added. The temperature was maintained for one hour, cooled to ambient temperature, and 45.0 g of ammonium sulfate, 10.0 g sodium thiosulfate, and 10.0 g acetic acid were added. The final product was a smooth milky white dispersion with a bulk viscosity of 1950 cps. Upon dilution to 0.5% active polymer, a solution viscosity of 74 cps in 2% aqueous ammonium sulfate was obtained.

EXAMPLE 2

To determine the increased effectiveness of the higher polymer solids polymer synthesized according to the procedure of Example 1 at improving the clarity of the waste water, jar tests were performed at an animal food production facility. 200 ml snatch samples of untreated effluents were taken from a sump in the facility prior to the reception pit. The appropriate amount of polymer was added to the sample at a pH of 7.1. The solution was mixed 5 seconds vigorously, then slowly for 30 seconds.

The clarity of the supernatant was determined by a visual evaluation with values assigned from 1 to 10, where 10 is the most free of solids and is most desirable. Floc size is also based on a visual evaluation, wherein a larger floc (higher number) is more desirable.

Table I illustrates the results of the comparison between Polymer A (20% actives dispersion polymer DR-3000, available from Derypol S.A. Corporation of Spain) and Polymer B (25% actives dispersion polymer, synthesized according to the procedure described in Example 1). The molecular weights of the two polymers were considered to be equal based on the fact that Polymer A and Polymer B had equivalent reduced specific viscosity measurement values as recorded in 0.125 N $NaNO_3$ solutions.

The dosages of the products in Table I were adjusted to an equal polymer actives basis. Normally one would expect an equal performance on an actives basis since the polymers are of the same chemical composition and molecular weight, but in this case, increased effectiveness and efficiency were evident with Polymer B of this invention, above that obtained with commercially available Polymer A. Superior floc size and water clarity were obtained with Polymer B compared to Polymer A, thus a significantly lower treatment dosage can be utilized.

The surprising results were obtained at 25% concentration values. One skilled ir the art, cognizant of this surprisingly great result would thereafter understand that a even higher concentrations should also produce this augmented effect.

TABLE I

| Treatment | Dosage (ppm)[1] | Floc size[2] | Supernate clarity[3] |
|---|---|---|---|
| Polymer A | 2 | 5 | 5 |
| Polymer A | 3 | 6 | 6 |
| Polymer A | 4 | 7 | 7 |
| Polymer A | 5 | 7.5 | 7.5 |
| Polymer A | 6 | 8 | 8 |
| Polymer B | 2.5 | 7 | 7 |
| Polymer B | 3 | 8 | 8 |
| Polymer B | 3.75 | 9 | 9 |
| Polymer B | 5 | 9 | 9 |
| Polymer B | 6.25 | 9 | 9 |

Polymer A = 20% actives dispersion polymer DR-3000, available from Derypol S.A. Corporation of Spain
Polymer B = 25% actives dispersion polymer, synthesized according to the procedure described in Example 1
[1]= dosage of polymer listed on an equal actives basis
[2]= scale of 1–10, with 10 most desirable as it represents greatest floc size
[3]= scale of 1–10, with 10 most desirable as it represents the highest clarity

EXAMPLE 3

A comparison of the polymers synthesized according to the procedure of Example 1 was also made for effectiveness as a treatment for the purposes of sludge dewatering on a twin belt press of a food production facility.

Polymer A and Polymer B were fed into the food processing waste water stream using a NALMAT dosing system (available from Nalco Chemical Co., Naperville, Ill.) which was previously used for trials with latex polymers. An initial dilution was carried out and the polymer was prepared as a diluted solution. The solution of Polymer B had to be prepared at a lower concentration than Polymer A due to the much higher Brookfield viscosity. A primary diluted polymer was initially prepared with the NALMAT dosing system followed by a secondary dilution with a static mixer in order to reach a lower concentration. The two dilution strengths are indicated in Table II's results.

The turbidity of the filtrate released from the belt filter press was measured with a Hach® DR-2000 spectrophotometer. The lower the turbidity reading, the better the polymers' performance. The cake solids (final sludge at the outlet of the belt filter press) were determined gravimetrically according to standard procedures. The higher the cake solids are, the more effective the treatment was in dewatering the removed solids waste water (or sludge). Cake solids can be artificially high when the performance of the polymer is poor and a significant amount of solids is squeezed out of the machine. Therefore the overall performance of the polymer must be considered. Since the performance of a belt press is very much based on visual evaluation, the following parameters were observed: floc size and shape; free-drainage zone clarity; wedge zone sludge stability (squeezing); and press zone stability (which includes cake stickiness and mat characteristics).

These results are shown in Table II. Improved performance was obtained with Polymer B, above the commercially available Polymer A. As a result of treatment with Polymer B, the cake solids were similar to Polymer A. However, with Polymer B overall quality was very good, the belt was free of blinding (i.e.—plugged belt) and the clarity of the filtrate was superior at a lower dosage when compared to Polymer A. As in Example 2, one would normally expect an equal performance on an actives basis since the polymers are of the same chemical composition and molecular weight. However, increased effectiveness and efficiency were evident with Polymer B of this invention above that obtained with the commercially available Polymer A.

TABLE II

| Treatment | Dosage[1] (ppm) | Solution Strength[2] (%) | Visual Performance | Cake Solids[3] (%) | Turbidity[4] (NTU) |
|---|---|---|---|---|---|
| Polymer A | 56 | 0.4/0.16 | Overdosed | N/A | 267 |
| Polymer A | 34 | 0.4/0.16 | Overdosed | 20.7 | 269 |
| Polymer A | 24 | 0.4/0.16 | Good | 21 | 242 |
| Polymer A | 22 | 0.4/0.16 | Lower limit | 18.6 | 277 |
| Polymer A | 20 | 0.4/0.16 | Underdosed | N/A | N/A |
| Polymer B | 33.4 | 0.18/0.04 | Good-still overdosed | 19.2 | 175 |
| Polymer B | 26 | 0.18/0.04 | Very good | 19.7 | 262 |
| Polymer B | 21.25 | 0.18/0.06 | Excellent | 20.8 | 217 |
| Polymer B | 14.25 | 0.14/0.03 | Very good | 18 | 131 |

N/A = not available
Polymer A = 20% actives dispersion polymer DR-3000, available from Derypol S.A. Corporation of Spain
Polymer B = 25% actives dispersion polymer, synthesized according to the procedure described in Example 1
[1]= dosage of polymer listed on an equal actives basis
[2]= listed as solution concentration of active polymer. The first number represents the primary dilution, the second number represents the secondary dilution
[3]= higher percentages of cake solids are more desirable
[4]= lower turbidity is more desirable

EXAMPLE 4

The polymers synthesized according to the procedure of Example 1 were also compared as to their abilities to dewater sludge during centrifugation from oily, grease-containing wastewater at a wastewater disposal facility.

Polymer A and Polymer B were fed in-line using a Gear pump. With this type of set-up, a change in dosage would automatically lead to a change in the solution strength as shown in Table III.

The centrate (outlet water from the centrifuge) clarity and cake quality were compared qualitatively on a visual basis and the results are summarized in Table III. Very good performance was obtained with both polymers, but that of Polymer B was superior.

For Table III, the lower the value for the centrate clarity, the better the performance of the polymer. Even though the centrate clarity was equal between the two polymers at equal dosage, Polymer B was superior due to the higher cake quality (drier cake, less sticky, more compact) across the dosage range. In this Example, as with the previous examples, one would normally expect an equal performance on an actives basis since the polymers are of the same chemical composition and molecular weight. Table III indicates that increased effectiveness and efficiency were evident with Polymer B of this invention, above that obtained with the commercially available Polymer A.

TABLE III

| Treatment | Dosage[1] (ppm) | Solution Strength[2] (%) | Centrate Clarity[3] | Cake Solids |
|---|---|---|---|---|
| Polymer A | 71 | 0.24 | 1 | OK |
| Polymer A | 58 | 0.20 | 2 | OK |
| Polymer A | 45 | 0.15 | 3 | OK |
| Polymer B | 91 | 0.2 | 0 | better |

TABLE III-continued

| Treatment | Dosage[1] (ppm) | Solution Strength[2] (%) | Centrate Clarity[3] | Cake Solids |
|---|---|---|---|---|
| Polymer B | 68 | 0.15 | 1 | than with |
| Polymer B | 58 | 0.13 | 2 | Polymer A |

Polymer A = 20% actives dispersion polymer DR-3000, available from Derypol S.A. Corporation of Spain
Polymer B = 25% actives dispersion polymer, synthesized according to the procedure described in Example 1
[1]= dosage of polymer listed on an equal actives basis
[2]= listed as solution concentration of active polymer
[3]= scale of 0–3, 0 represents highest water clarity and is most desirable

EXAMPLE 5

The polymers synthesized according to the procedure of Example 1 were also compared as to their abilities to dewater sludge composed of inorganic contaminated soils from railways. A procedure similar to that of Example 2 was utilized to obtain the results of Table IV.

The dosage of the polymers in Table IV were adjusted to an equal polymer actives basis. The performance of the polymers was evaluated in terms of floc size (the largest floc size is most desirable), sludge settling rate (a faster settling rate is more desirable), floc stability towards shear (stronger resistance to shear is more desirable) and drainage rate (highest volume of water drained is most desirable). Though one would normally expect an equal performance on an actives basis since the polymers are of the same chemical composition and molecular weight, Table IV shows that increased effectiveness and efficiency were evident with Polymer B above that obtained with commercially available Polymer A.

TABLE IV

| Treatment | Dosage[1] (ppm) | Solution Strength (%)[2] | Floc Size Formation[3] | Settling Rate[4] | Floc Stability[5] | Drainage Rate (ml/m)[6] |
|---|---|---|---|---|---|---|
| Polymer A | 500 | 0.30 | small | slow | weak | 35 |
| Polymer A | 500 | 0.16 | small | slow | weak | |
| Polymer A | 500 | 0.10 | very small | slowest | weak | |
| Polymer B | 213 | 0.05 | small | relative fast | good | |
| Polymer B | 213 | 0.13 | medium | fast | good | |
| Polymer B | 213 | 0.20 | good | fast | good | 85 |

Polymer A = 20% actives dispersion polymer DR-3000, available from Derypol S.A. Corporation of Spain
Polymer B = 25% actives dispersion polymer, synthesized according to the procedure described in Example 1
[1]= dosage of polymer listed on an equal actives
[2]= listed as solution concentration of active polymer
[3]= larger floc is more desirable
[4]= faster settling is more desirable
[5]= greater floc stability is more desirable
[6]= faster drainage is more desirable

EXAMPLE 6

The polymers synthesized according to the procedure of Example 1 were also compared as to their retention and drainage capabilities at a recycled board mill.

Both Polymer A and Polymer B were fed directly in line prior to the pressure screen. A simple static mixer was used to prepare the polymer solution. No aging tank was required.

The performance of the two polymers was evaluated by measuring the First Pass Retention (FPR). FPR is a measure of the amount of fibers, fines and fillers which are retained in the paper sheet and is calculated by the following equation:

$$\% FPR = [(A-B)/A] \times 100$$

A=concentration of the headbox furnish (g/l)
B=concentration of the whitewater (i.e. filtrate) (g/l)

It is desirable to have as high a % FPR as possible. As clearly demonstrated in Table V, Polymer B was more efficient than Polymer A since a significantly lower dosage of Polymer B was required in order to achieve equal % FPR to that obtained by use of Polymer A. Again one would normally expect an equal performance on an actives basis since the polymers are of the same chemical composition and molecular weight, but in this case increased efficiency was evident with Polymer B of this invention, above that obtained with the commercially available Polymer A.

TABLE V

| Treatment | Total Retention FPR[1] (%) | Dosage[2] (kg/t) |
|---|---|---|
| Polymer A | 37 | 0.15 |
| Polymer A | 54 | 0.3 |
| Polymer A | 50 | 0.3 |
| Polymer B | 48 | 0.13 |
| Polymer B | 48 | 0.13 |
| Polymer B | 52 | 0.19 |

Polymer A = 20% actives dispersion polymer DR-3000, available from Derypol S.A. Corporation of Spain
Polymer B = 25% actives dispersion polymer, synthesized according to the procedure described in Example 1
[1]= higher percentages of first pass retention are desired
[2]= dosage of polymer listed on an equal actives basis

EXAMPLE 7

The polymers synthesized according to the methods of Example 1 were also compared in their ability to dewater oily sludge from a refinery. A sludge sample was collected prior to the twin belt press used for dewatering. The polymers were evaluated using a free-drainage test carried out in the following way: The desired amount of polymer was added to 200 mL of sludge and mixed with 10 inversions using graduated cylinders. The test loading was poured into a pipe resting on top of a filter cloth and timing was started immediately. The free drainage volume obtained after 10 seconds was recorded.

The results are shown in Table VI where drainage volume at 10 seconds is given. The higher the volume drained, the more effective is dewatering. As clearly shown in Table IV, Polymer B outperformed Polymer A on an actives basis, for polymer B is both more effective (higher volume drained) and more efficient (less dosage required). Again one would normally expect an equal performance on an actives basis since the polymers are of the same chemical composition and molecular weight, but in this case increased efficiency was evident with Polymer B of this invention, above that obtained with the commercially available Polymer A.

TABLE VI

| Treatment | Dosage[1] (ppm) | Drainage Volume[2] (mL) at 10 sec. |
|---|---|---|
| Polymer A | 80 | 68 |
| Polymer A | 100 | 96 |
| Polymer A | 125 | 96 |
| Polymer A | 140 | 96 |
| Polymer B | 75 | 95 |
| Polymer B | 87.5 | 107 |
| Polymer B | 100 | 108 |

TABLE VI-continued

| Treatment | Dosage[1] (ppm) | Drainage Volume[2] (mL) at 10 sec. |
|---|---|---|
| Polymer B | 112.5 | 108 |
| Polymer B | 125 | 95 |

Polymer A = 20% actives dispersion polymer DR-3000, available from Derypol S.A. of Spain.
Polymer B = 25% actives dispersion polymer, synthesized according to the procedure described in Example 1.
[1] = dosage of polymer listed on an equal actives basis
[2] = higher drainage is more desirable Changes can be made in the composition, operation and arrangement of the method of the present invention described herein without departing from the concept and scope of the invention as defined in the following claims:

We claim:

1. A method of clarifying and dewatering waste water comprising adding to the waste water an effective amount of a water-soluble cationic polymer dispersion containing at least 25 weight percent polymer solids, wherein the water-soluble cationic polymer dispersion is prepared by polymerizing monomers under free radical forming conditions in an aqueous solution of an anionic salt in the presence of two or more stabilizer polymers, the monomers selected from the group consisting of:

(a) at least 5 mole % of a cationic monomer of formula

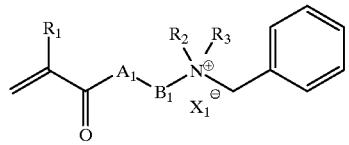

wherein
$R_1$ is selected from the group consisting of H and $CH_3$;
$R_2$ and $R_3$ are selected from $C_1$ akyl and $C_2$ alkyl;
$A_1$ is O;
$B_1$ is $C_2$ alkyl or $C_3$ alkyl; and
$X_1^-$ is an anionic counterion and (b) a monomer of formula:

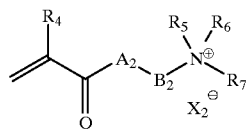

wherein
$R_4$ is H or $CH_3$;
$R_5$ and $R_6$ are selected from $C_1$ alkyl and $C_2$ alkyl;
$R_7$ is H, $C_1$ alkyl or $C_2$ alkyl;
$B_2$ is $C_2$ alkyl or $C_3$ alkyl; and
$X_2^-$ is an anionic counterion and c) at least 5 mole % of acrylamide or methacrylamide,
wherein the stabilizer polymers are cationic polymers that are at least partially soluble in the aqueous solution of the anionic salt, the stabilizer polymers comprising:

(a) at least one cationic polymer consisting of diallyldimethylammonium chloride and a monomer of formula

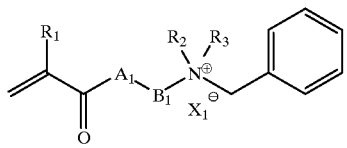

wherein
$R_1$ is H or $CH_3$;
$R_2$ and $R_3$ are selected from $C_1$ alkyl and $C_2$ alkyl;
$A_1$ is O;
$B_1$ is $C_2$ alkyl or $C_3$ alkyl; and
$X_1^-$ is an anionic counterion, and (b) at least one cationic polymer consisting of cationic monomers of formula:

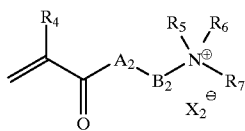

wherein
$R_4$ is H or $CH_3$;
$R_5$ and $R_6$ are selected from $C_1$ alkyl and $C_2$ alkyl;
$R_7$ is H, $C_1$ alkyl or $C_2$ alkyl;
$A_2$ is O;
$B_2$ is $C_2$ alkyl or $C_3$ alkyl; and
$X_2^-$ is an anionic counterion.

2. The method of claim 1 wherein the waste water is selected from industrial waste water and mumicipal waste water.

3. The method of claim 2 wherein said industrial wastewater is selected from food processing waste water, oily waste water, paper mill waste water and inorganic-contaminated waste water.

4. The method of claim 1 wherein the anionic salt is selected from phosphates, sulfates, chlorides and mixtures thereof.

5. The method of claim 1 further comprising adding an effective amount of at least one coagulant to the waste water.

6. The method of claim 1 wherein the cationic dispersion polymer is prepared from monomers selected from the group consisting of (a) at least 5 mole % of dimethylaminoethylacrylate benzyl chloride quaternary salt;

(b) dimethylaminoethylacrylate methyl chloride quaternary salt; and (c) at least 5 mole % of acrylamide.

7. The method of claim 1 wherein the stabilizer polymers are a homopolymer of dimethylaminoethylacrylate methyl chloride quaternary and a copolymer of dimethylaminoethylacrylate benzyl chloride quaternary and diallyldimethylammonium chloride.

8. A method of improving retention and drainage in a paper furnish comprising adding to the paper furnish an effective amount of a water-soluble cationic polymer dispersion containing at least 25 weight percent polymer solids, wherein the water-soluble cationic polymer dispersion is prepared by polymerizing monomers under free radical forming conditions in an aqueous solution of an anionic salt in the presence of two or more stabilizer polymers, the monomers selected from the group consisting of:

(a) at least 5 mole % of a cationic monomer of formula

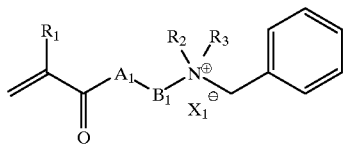

wherein
R$_1$ is selected from the group consisting of H and CH$_3$;
R$_2$ and R$_3$ are selected from C$_1$ alkyl and C$_2$ alkyl;
A$_1$ is O;
B$_1$ is C$_2$ alkyl or C$_3$ alkyl; and
X$_1^-$ is an anionic counterion and (b) a monomer of formula:

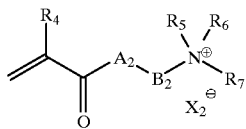

wherein
R$_4$ is H or CH$_3$;
R$_5$ and R$_6$ are selected from C$_1$ alkyl and C$_2$ alkyl;
R$_7$ is H, C$_1$ alkyl or C$_2$ alkyl;
A$_2$ is O;
B$_2$ is C$_2$ alkyl, C$_3$ alkyl or C$_4$ alkyl; and
X$_2^-$ is an anionic counterion and c) at least 5 mole % of acrylamide or methacrylamide, wherein the stabilizer polymers are cationic polymers that are at least partially soluble in the aqueous solution of the anionic salt, the stabilizer polymers comprising:

(a) at least one cationic polymer consisting of diallyldimethylammonium chloride and a monomer of formula

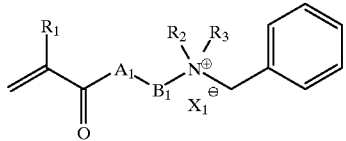

wherein
R$_1$ is H or CH$_3$;
R$_2$ and R$_3$ are selected from C$_1$ alkyl and C$_2$ alkyl;
A$_1$ is O;
B$_1$ is C$_2$ alkyl or C$_3$ alkyl; and
X$_1^-$ is an anionic counterion, and (b) at least one cationic polymer consisting of cationic monomers of formula:

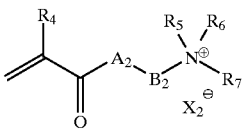

wherein
R$_4$ is H or CH$_3$;
R$_5$ and R$_6$ are selected from C$_1$ alkyl and C$_2$ alkyl;
R$_7$ is H, C$_1$ alkyl or C$_2$ alkyl;
A$_2$ is O;
B$_2$ is C$_2$ alkyl or C$_3$ alkyl; and
X$_2^-$ is an anionic counterion.

9. The method of claim 8 wherein the anionic salt is selected from phosphates, sulfates, chlorides and mixtures thereof.

10. The method of claim 8 wherein the cationic dispersion polymer is prepared from monomers selected from the group consisting of (a) at least 5 mole % of dimethylaminoethylacrylate benzyl chloride quaternary salt;

(b) dimethylaminoethylacrylate methyl chloride quaternary salt; and (c) at least 5 mole % of acrylamide.

11. The method of claim 8 wherein the stabilizer polymers are a homopolymer of dimethylaminoethylacrylate methyl chloride quaternary and a copolymer of dimethylaminoethylacrylate benzyl chloride quaternary and diallyldimethylammonium chloride.

* * * * *